United States Patent
Park et al.

(10) Patent No.: US 12,504,890 B2
(45) Date of Patent: *Dec. 23, 2025

(54) STORAGE DEVICE AND METHOD OF OPERATING THE SAME

(71) Applicant: SK hynix Inc., Gyeonggi-do (KR)

(72) Inventors: Gyeong Min Park, Gyeonggi-do (KR); Jong Tack Jung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/811,782

(22) Filed: Aug. 22, 2024

(65) Prior Publication Data

US 2024/0411460 A1    Dec. 12, 2024

Related U.S. Application Data

(63) Continuation of application No. 18/173,068, filed on Feb. 23, 2023, now Pat. No. 12,105,964.

(30) Foreign Application Priority Data

Jul. 12, 2022    (KR) .................... 10-2022-0085624

(51) Int. Cl.
*G06F 12/00*    (2006.01)
*G06F 3/06*    (2006.01)

(52) U.S. Cl.
CPC .......... *G06F 3/0619* (2013.01); *G06F 3/0631* (2013.01); *G06F 3/0679* (2013.01)

(58) Field of Classification Search
CPC .... G06F 3/0619; G06F 3/0631; G06F 3/0679; G06F 11/10; G06F 11/1446; G06F 12/0238

See application file for complete search history.

(56) References Cited

U.S. PATENT DOCUMENTS

2021/0249098 A1* 8/2021 Takubo ................. G11C 29/24
2021/0311661 A1* 10/2021 Kotzur ................ G06F 11/1076

* cited by examiner

*Primary Examiner* — Shawn X Gu
(74) *Attorney, Agent, or Firm* — IP & T GROUP LLP

(57) ABSTRACT

According to the present technology, a storage device may include a plurality of first memory devices, a second memory device, and a memory controller. Each of the plurality of first memory devices may include a plurality of zones in which sequential writing is performed. The second memory device may include a plurality of parity zones. The memory controller may allocate to a parity group, first zones included in the respective first memory devices and a first parity zone storing parity data for data stored in the first zones, release from the parity group, the first zone invalidated among the first zones by writing new data into a target zone different from the invalidated first zone among the zones included in the first memory device including the invalidated first zone, and allocate the target zone to the parity group.

20 Claims, 10 Drawing Sheets

STORAGE DEVICE AND METHOD OF OPERATING THE SAME

CROSS-REFERENCE TO RELATED APPLICATION

The present application is a continuation of U.S. patent application Ser. No. 18/173,068 filed on Feb. 23, 2023, which claims priority under 35 U.S.C. § 119(a) to Korean patent application number 10-2022-0085624, filed on Jul. 12, 2022, the entire disclosure of which is incorporated herein by reference.

BACKGROUND

1. Field of Invention

Various embodiments of the present disclosure relate to an electronic device, and more particularly, to a storage device and a method of operating the same.

2. Description of Related Art

A storage device is a device that stores data under control of a host device such as a computer or a smartphone. The storage device may include a memory device in which data is stored and a memory controller controlling the memory device. The memory device may be a volatile memory device or a nonvolatile memory device.

The storage device may include a plurality of memory devices and a parity memory device for recovery of data stored in the plurality of memory devices. When an error occurs in data stored in any of the plurality of memory devices, the memory controller may recover the data in which the error occurs using data stored in the other memory devices and parity data stored in the parity memory device.

SUMMARY

An embodiment of the present disclosure provides a storage device and a method of operating the same which manages parity data in the storage device including a parity zone and a plurality of zones in which sequential writing is performed.

According to an embodiment of the present disclosure, a storage device may include a plurality of first memory devices, a second memory device, and a memory controller. Each of the plurality of first memory devices may include a plurality of zones on which sequential writing is performed. The second memory device may include a plurality of parity zones. The memory controller may allocate to a parity group, first zones included in the respective first memory devices and a first parity zone storing parity data for data stored in the first zones, the first parity zone being one of the parity zones in the second memory device, release from the parity group, the first zone invalidated among the first zones by writing new data into a target zone different from the invalidated first zone among the zones included in the first memory device including the invalidated first zone, and allocate the target zone to the parity group.

According to an embodiment of the present disclosure, a memory controller may include a storage area manager and a write controller. The storage area manager may allocate to a parity group, first zones included in respective first memory devices and a first parity zone included in a second memory device, sequential writing being performed on the first zones and the first parity zone storing parity data for data stored in the first zones. The write controller may write new data in a selected first memory device of the first memory devices. The storage area manager may release from the parity group, the first zone invalidated among the first zones by writing the new data into a target zone different from the invalidated first zone among zones included in the selected first memory device having the invalidated first zone and allocate the target zone to the parity group.

According to an embodiment of the present disclosure, a method of operating a storage device may include allocating to a parity group, first zones included in respective first memory devices and a first parity zone included in a second memory device, sequential writing being performed on the first zones and the first parity zone storing parity data for data stored in the first zones, storing new data in a selected first memory device of the first memory devices, releasing from the parity group, the first zone invalidated among the first zones by writing the new data into a target zone among zones included in the selected first memory device having the invalidated first zone, and allocating the target zone to the parity group.

According to an embodiment of the present disclosure, a memory system may include at least first and second dies, a parity die, and a controller. The at least first and second dies may include data zones storing original first and second data, respectively. The parity die may include an original parity zone storing an original parity data for the original first and second data. The memory controller may control the first die to store updated first data in a target data zone, generate an updated parity data based on the original parity data and the original and updated first data, invalidate the original first data, and control the parity die to store the updated parity data in a target parity zone.

According to the present technology, a storage device and a method of operating the same which manages parity data in the storage device including a parity zone and a plurality of zones in which sequential writing is performed are provided.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
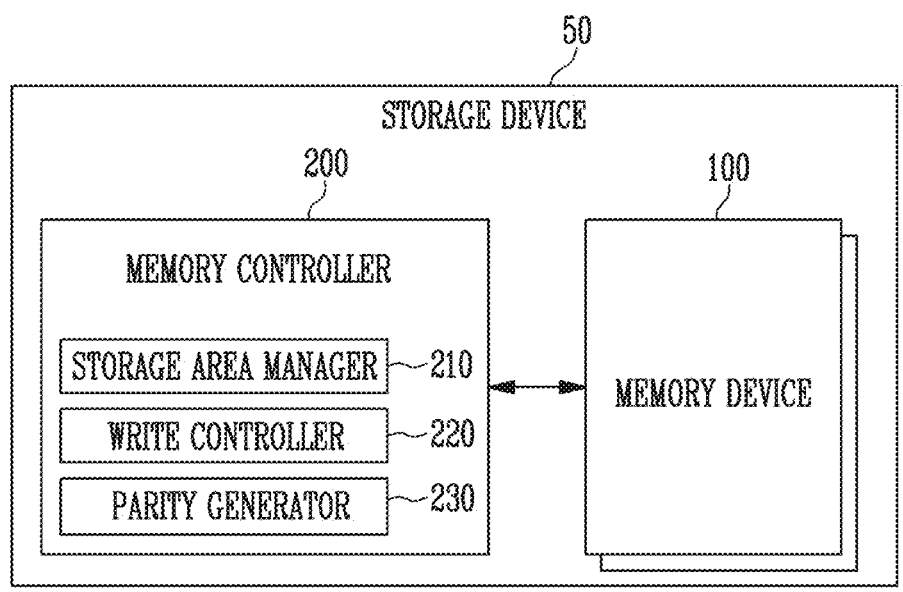
FIG. 1 is a diagram illustrating a storage device according to an embodiment of the present disclosure.

FIG. 1 is a diagram illustrating a computing system according to an embodiment of the present disclosure.

Referring to FIG. 1, the computing system may include a storage device 50 and a host. In an embodiment, a memory system may include the storage device 50.

The storage device 50 may include a memory device 100 and a memory controller 200 that controls an operation of the memory device. In an embodiment, a memory die may include the memory device. The storage device 50 is a device that stores data under control of the host such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with the host. For example, the storage device 50 may be configured as any of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any of various types of packages. For example, the storage device 50 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array including a plurality of memory cells that store data.

Each of the memory cells may be configured as a single level cell (SLC) storing one data bit, a multi-level cell (MLC) storing two data bits, a triple level cell (TLC) storing three data bits, or a quad level cell (QLC) storing four data bits.

The memory cell array may include a plurality of memory blocks. Each memory block may include a plurality of memory cells. One memory block may include a plurality of pages. In an embodiment, the page may be a unit for storing data in the memory device 100 or reading data stored in the memory device 100.

The memory block may be a unit for erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 may receive a command and an address from the memory controller 200 and access an area selected by the address of the memory cell array. That is, the memory device 100 may perform an operation instructed by the command on the area selected by the address. For example, the memory device 100 may perform a write operation (program operation), a read operation, and an erase operation. During the program operation, the memory device 100 may program data to the area selected by the address. During the read operation, the memory device 100 may read data from the area selected by the address. During the erase operation, the memory device 100 may erase data stored in the area selected by the address.

The memory controller 200 may control an overall operation of the storage device 50.

When power is applied to the storage device 50, the memory controller 200 may execute firmware FW. When the memory device 100 is a flash memory device, the memory controller 200 may operate firmware such as a flash translation layer (FTL) for controlling communication between the host and the memory device 100.

In an embodiment, the memory controller 200 may receive data and a logical block address (LBA) from the host and convert the LBA into a physical block address (PBA) indicating an address of memory cells in which data included in the memory device 100 is to be stored.

The memory controller 200 may control the memory device 100 to perform the program operation, the read operation, or the erase operation in response to a request from the host. During the program operation, the memory controller 200 may provide a write command, a physical block address, and data to the memory device 100. During the read operation, the memory controller 200 may provide a read command and the physical block address to the memory device 100. During the erase operation, the memory controller 200 may provide an erase command and the physical block address to the memory device 100.

In an embodiment, the memory controller 200 may generate and transmit the command, the address, and the data to the memory device 100 regardless of the request from the host. For example, the memory controller 200 may provide the command, the address, and the data to the memory device 100 to perform background operations such as a program operation for wear leveling and a program operation for garbage collection.

In an embodiment, the memory controller 200 may control at least two memory devices 100. In this case, the memory controller 200 may control the memory devices 100 according to an interleaving method to improve operation performance. The interleaving method may be an operation method for overlapping operation periods of at least two memory devices 100.

The memory controller 200 may control a plurality of memory devices 100 connected through at least one or more channels. Each memory device 100 may include a plurality of zones. The zone may be an area in which a sequential write is performed, and data corresponding to consecutive logical addresses may be stored in the zone.

The zone may include at least one or more pages. The zone may include at least one or more memory blocks. The zone may correspond to a super block. A size of the zone is not limited to the present embodiment and may be freely set.

In an embodiment, the storage device 50 may include a plurality of memory devices 100. The plurality of memory devices 100 may include a plurality of first memory devices each including a plurality of zones in which sequential writing is performed, and a second memory device including a plurality of parity zones.

In an embodiment, the memory controller 200 may include a storage area manager 210, a write controller 220, and a parity generator 230.

The storage area manager 210 may allocate first zones included in the respective first memory devices and a first parity zone storing parity data of data stored in the first zones to a parity group. The storage area manager 210 may release, from the parity group, the first zone invalidated among the first zones by writing of new data into a target zone different from the invalidated first zone among the zones included in the first memory device including the invalidated first zone. The storage area manager 210 may allocate the target zone to the parity group. The storage area manager 210 may release the first parity zone from the parity group and allocate, to the parity group, a second parity zone different from the first parity zone among a plurality of parity zones.

The write controller 220 may control the first memory device to store the new data in the target zone. The write controller 220 may control the second memory device to store new parity data in a second parity zone.

The parity generator 230 may generate the new parity data by performing an exclusive OR operation on data stored in the invalidated first zone, the parity data, and the new data.

In an embodiment, the second memory device and the plurality of first memory devices may include memory cells each configured to store the same number of bits. In another embodiment, the second memory device may include memory cells each configured to store n bits, and the plurality of first memory devices may include memory cells each configured to store m bits greater than the n bits.

The host may communicate with the storage device 50 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

Figure 2:
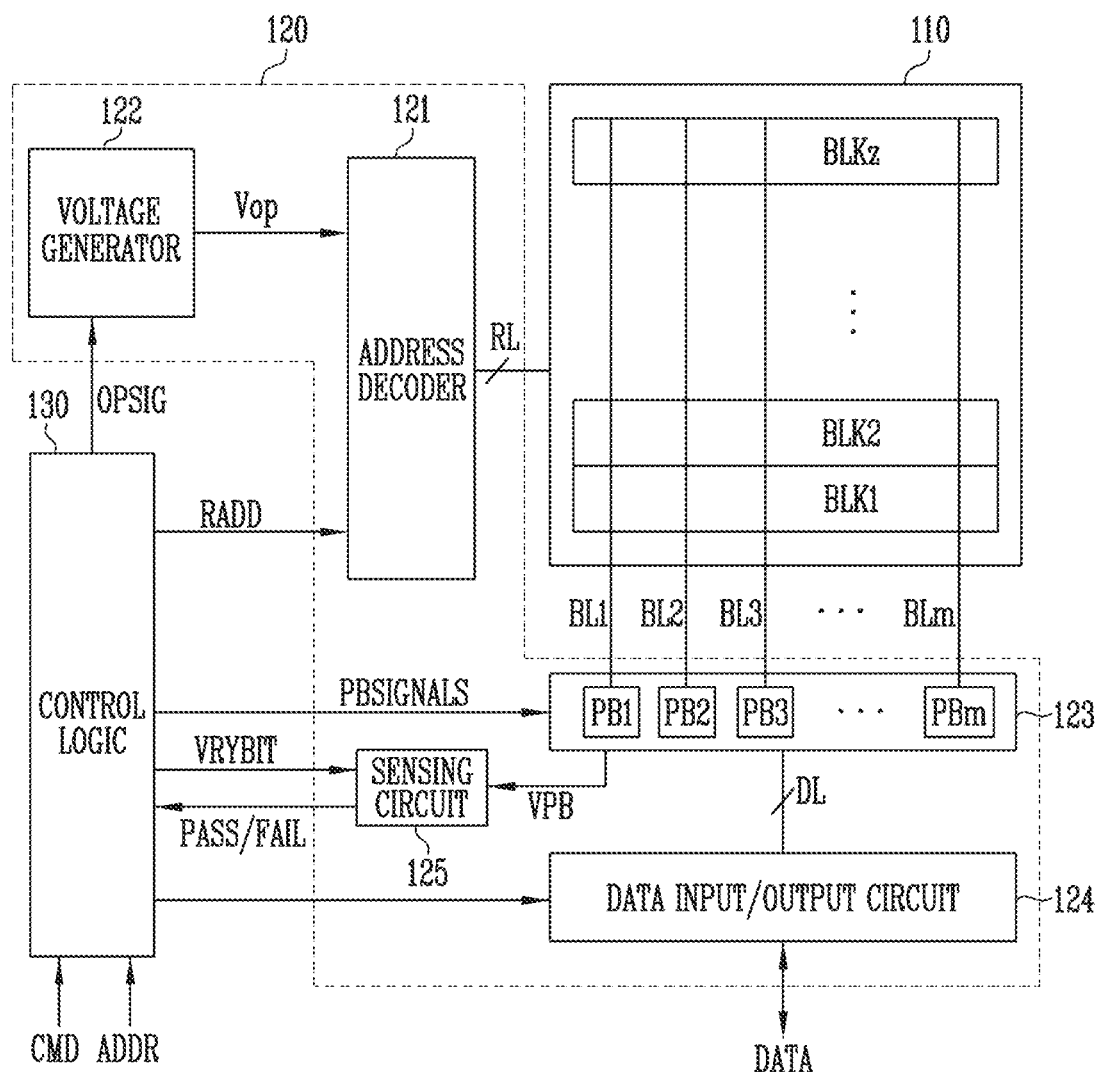
FIG. 2 is a diagram illustrating a structure of a memory device of FIG. 1 according to an embodiment of the present disclosure.

FIG. 2 is a diagram illustrating a structure of the memory device of FIG. 1 according to an embodiment of the present disclosure.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to an address decoder 121 through row lines RL. The plurality of memory blocks BLK1 to BLKz are connected to a read and write circuit 123 through bit lines BL1 to BLm. Each of the plurality of memory blocks BLK1 to BLKz includes a plurality of memory cells. In an embodiment, the plurality of memory cells are nonvolatile memory cells. Memory cells connected to the same word line among the plurality of memory cells are defined as one physical page. That is, the memory cell array 110 is configured of a plurality of physical pages. According to an embodiment of the present disclosure, each of the plurality of memory blocks BLK1 to BLKz included in the memory cell array 110 may include a plurality of dummy cells. At least one of the dummy cells may be connected in series between a drain select transistor and the memory cells, and between a source select transistor and the memory cells.

Each of the memory cells of the memory device 100 may be configured as an SLC that stores one data bit, an MLC that stores two data bits, a TLC that stores three data bits, or a QLC that stores four data bits.

The peripheral circuit 120 may include an address decoder 121, a voltage generator 122, the read and write circuit 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The address decoder 121 is connected to the memory cell array 110 through the row lines RL. The row lines RL may include drain select lines, word lines, source select lines, and a common source line. According to an embodiment of the present disclosure, the word lines may include normal word lines and dummy word lines. According to an embodiment of the present disclosure, the row lines RL may further include a pipe select line.

The address decoder 121 may operate in response to control of the control logic 130. The address decoder 121 receives an address ADDR from the control logic 130.

The address decoder 121 may decode a block address of the received address ADDR. The address decoder 121 selects at least one memory block among the memory blocks BLK1 to BLKz according to the decoded block address. The address decoder 121 may decode a row address RADD of the received address ADDR. The address decoder 121 may select at least one word line among word lines of a selected memory block according to the decoded row address RADD. The address decoder 121 may apply an operation voltage Vop received from the voltage generator 122 to the selected word line.

During the program operation, the address decoder 121 may apply a program voltage to a selected word line and apply a pass voltage having a level less than that of the program voltage to unselected word lines. During a program verify operation, the address decoder 121 may apply a verify voltage to the selected word line and apply a verify pass voltage having a level greater than that of the verify voltage to the unselected word lines.

During the read operation, the address decoder 121 may apply a read voltage to the selected word line and apply a read pass voltage having a level greater than that of the read voltage to the unselected word lines.

According to an embodiment of the present disclosure, the erase operation of the memory device 100 is performed in a memory block unit. The address ADDR input to the memory device 100 during the erase operation includes a block address. The address decoder 121 may decode the block address and select at least one memory block according to the decoded block address. During the erase operation, the address decoder 121 may apply a ground voltage to the word lines input to the selected memory block.

According to an embodiment of the present disclosure, the address decoder 121 may decode a column address of the transferred address ADDR. The decoded column address may be transferred to the read and write circuit 123. As an example, the address decoder 121 may include a component such as a row decoder, a column decoder, and an address buffer.

The voltage generator 122 may generate a plurality of operation voltages Vop by using an external power voltage supplied to the memory device 100. The voltage generator 122 operates in response to the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate the plurality of operation voltages Vop using the external power voltage or the internal power voltage. The voltage generator 122 may generate various voltages required by the memory device 100. For example, the voltage generator 122 may generate a plurality of erase voltages, a plurality of program voltages, a plurality of pass voltages, a plurality of selection read voltages, and a plurality of non-selection read voltages.

In order to generate the plurality of operation voltages Vop having various voltage levels, the voltage generator 122 may include a plurality of pumping capacitors that receive the internal voltage and selectively activate the plurality of pumping capacitors in response to the control logic 130 to generate the plurality of operation voltages Vop. The plurality of generated operation voltages Vop may be supplied to the memory cell array 110 by the address decoder 121.

The read and write circuit 123 includes first to m-th page buffers PB1 to PBm. The first to m-th page buffers PB1 to PBm are connected to the memory cell array 110 through first to m-th bit lines BL1 to BLm, respectively. The first to m-th page buffers PB1 to PBm operate in response to the control of the control logic 130.

The first to m-th page buffers PB1 to PBm communicate data DATA with the data input/output circuit 124. At a time of program, the first to m-th page buffers PB1 to PBm receive the data DATA to be stored through the data input/output circuit 124 and data lines DL.

During the program operation, when a program voltage is applied to the selected word line, the first to m-th page buffers PB1 to PBm may transfer the data DATA to be stored, that is, the data DATA received through the data input/output circuit 124 to the selected memory cells through the bit lines BL1 to BLm. The memory cells of the selected page are programmed according to the transferred data DATA. A memory cell connected to a bit line to which a program permission voltage (for example, a ground voltage) is applied may have an increased threshold voltage. A threshold voltage of a memory cell connected to a bit line to which a program inhibition voltage (for example, a power voltage) is applied may be maintained. During the program verify operation, the first to m-th page buffers PB1 to PBm read the data DATA stored in the memory cells from the selected memory cells through the bit lines BL1 to BLm.

During the read operation, the read and write circuit 123 may read the data DATA from the memory cells of the selected page through the bit lines BL1 to BLm and store the read data DATA in the first to m-th page buffers PB1 to PBm.

During the erase operation, the read and write circuit 123 may float the bit lines BL1 to BLm. In an embodiment, the read and write circuit 123 may include a column select circuit.

The data input/output circuit 124 is connected to the first to m-th page buffers PB1 to PBm through the data lines DL. The data input/output circuit 124 operates in response to the control of the control logic 130.

The data input/output circuit 124 may include a plurality of input/output buffers (not shown) that receive input data DATA. During the program operation, the data input/output circuit 124 receives the data DATA to be stored from an external controller (not shown). During the read operation, the data input/output circuit 124 outputs the data DATA transferred from the first to m-th page buffers PB1 to PBm included in the read and write circuit 123 to the external controller.

During the read operation or the verify operation, the sensing circuit 125 may generate a reference current in response to a signal of an allowable bit VRYBIT generated by the control logic 130 and may compare a sensing voltage VPB received from the read and write circuit 123 with a reference voltage generated by the reference current to output a pass signal or a fail signal to the control logic 130.

The control logic 130 may be connected to the address decoder 121, the voltage generator 122, the read and write circuit 123, the data input/output circuit 124, and the sensing circuit 125. The control logic 130 may control all operations of the memory device 100. The control logic 130 may operate in response to a command CMD transferred from an external device.

The control logic 130 may generate various signals in response to the command CMD and the address ADDR to control the peripheral circuit 120. For example, the control logic 130 may generate an operation signal OPSIG, the address ADDR, a read and write circuit control signal PBSIGNALS, and the allowable bit VRYBIT in response to the command CMD and the address ADDR. The control logic 130 may output the operation signal OPSIG to the voltage generator 122, output the address ADDR to the address decoder 121, output the read and write control signal to the read and write circuit 123, and output the allowable bit VRYBIT to the sensing circuit 125. In addition, the control logic 130 may determine whether the verify operation is passed or failed in response to the pass or fail signal PASS/FAIL output by the sensing circuit 125.

Figure 3:
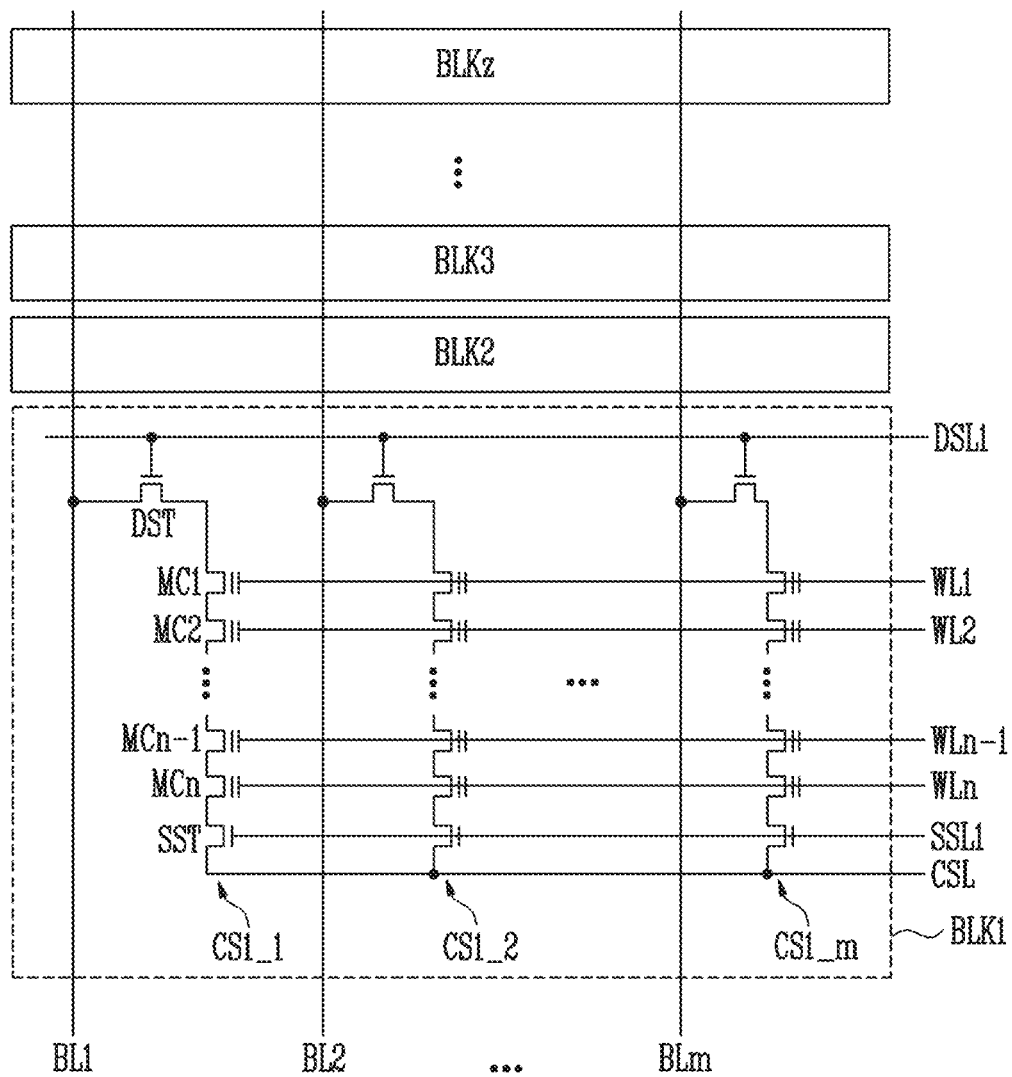
FIG. 3 is a diagram illustrating a memory cell array of FIG. 2 according to an embodiment of the present disclosure.

FIG. 3 is a diagram illustrating the memory cell array 110 of FIG. 2 according to an embodiment of the present disclosure.

Referring to FIG. 3, the first to z-th memory blocks BLK1 to BLKz are commonly connected to the first to m-th bit lines BL1 to BLm. In FIG. 3, for convenience of description, elements included in the first memory block BLK1 of the plurality of memory blocks BLK1 to BLKz are shown, and elements included in each of the remaining memory blocks BLK2 to BLKz are omitted. It will be understood that each of the remaining memory blocks BLK2 to BLKz is configured similarly to the first memory block BLK1.

The memory block BLK1 may include a plurality of cell strings $CS1\_1$ to $CS1\_m$, where m is a positive integer. The first to m-th cell strings $CS1\_1$ to $CS1\_m$ are connected to the first to m-th bit lines BL1 to BLm, respectively. Each of the first to m-th cell strings CS1_1 to CS1_m includes a drain select transistor DST, a plurality of memory cells MC1 to MCn connected in series, where n is a positive integer, and a source select transistor SST.

Gate terminals of the drain select transistors DST included in each of the first to m-th cell strings CS1_1 to CS1_m are connected to a drain select line DSL1. Gate terminals of the first to n-th memory cells MC1 to MCn included in each of the first to m-th cell strings CS1_1 to CS1_m are connected to the first to n-th word lines WL1 to WLn, respectively. Gate terminals of the source select transistors SST included in each of the first to m-th cell strings CS1_1 to CS1_m are connected to a source select line SSL1.

For convenience of description, a structure of the cell string will be described with reference to the first cell string CS1_1 of the plurality of cell strings CS1_1 to CS1_m. However, it will be understood that each of the remaining cell strings CS1_2 to CS1_m is configured similarly to the first cell string CS1_1.

A drain terminal of the drain select transistor DST included in the first cell string CS1_1 is connected to the first bit line BL1. A source terminal of the drain select transistor DST included in the first cell string CS1_1 is connected to a drain terminal of the first memory cell MC1 included in the first cell string CS1_1. The first to n-th memory cells MC1 to MCn are connected in series with each other. A drain terminal of the source select transistor SST included in the first cell string CS1_1 is connected to a source terminal of the n-th memory cell MCn included in the first cell string CS1_1. A source terminal of the source select transistor SST included in the first cell string CS1_1 is connected to a common source line CSL. In an embodiment, the common source line CSL may be commonly connected to the first to z-th memory blocks BLK1 to BLKz.

The drain select line DSL1, the first to n-th word lines WL1 to WLn, and the source select line SSL1 are included in row lines RL of FIG. 2. The drain select line DSL1, the first to n-th word lines WL1 to WLn, and the source select line SSL1 are controlled by the address decoder 121. The common source line CSL is controlled by the control logic 130. The first to m-th bit lines BL1 to BLm are controlled by the read and write circuit 123.

Figure 4:
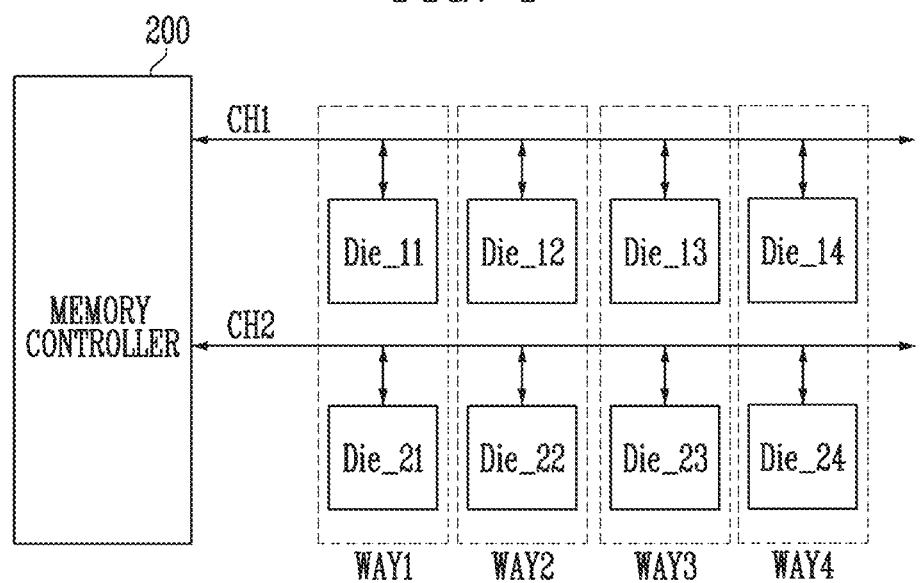
FIG. 4 is a diagram illustrating a method of controlling a plurality of memory devices according to an embodiment of the present disclosure.

FIG. 4 is a diagram illustrating a method of controlling a plurality of memory devices according to an embodiment of the present disclosure.

Referring to FIG. 4, the memory controller 200 may be connected to a plurality of memory devices Die_11 to Die_24 through a first channel CH1 and a second channel CH2. The number of channels or the number of memory devices connected to each channel is not limited to the present embodiment.

The memory devices Die_11 to Die_14 may be commonly connected to the first channel CH1. The memory devices Die_11 to Die_14 may communicate with the memory controller 200 through the first channel CH1.

Since the memory devices Die_11 to Die_14 are commonly connected to the first channel CH1, only one memory device may communicate with the memory controller 200 at once. However, an internal operation of each of the memory devices Die_11 to Die_14 may be simultaneously performed.

Memory devices Die_21 to Die_24 may be commonly connected to the second channel CH2. The memory devices Die_21 to Die_24 may communicate with the memory controller 200 through the second channel CH2.

Since the memory devices Die_21 to Die_24 are commonly connected to the second channel CH2, only one memory device may communicate with the memory controller 200 at once. An internal operation of each of the memory devices Die_21 to Die_24 may be simultaneously performed.

The storage device using the plurality of memory devices may improve performance by using data interleaving, which is data communication using an interleave method. The data interleaving may be performing a data read or write operation while moving between ways in a structure in which one channel is shared by two or more ways. For the data interleaving, the memory devices may be managed in a channel and way unit. In order to maximize parallelism of the memory devices connected to each of the channels, the memory controller 200 may distribute and allocate a continuous logical memory area into the channel and the way.

For example, the memory controller 200 may transmit a command, a control signal including an address, and data to the memory device Die_11 through the first channel CH1. While the memory device Die_11 programs the transmitted data into a memory cell included therein, the memory controller 200 may transmit a command, a control signal including an address, and data to the memory device Die_12.

In FIG. 4, a plurality of memory devices may be configured of four ways WAY1 to WAY4. A first way WAY1 may include the memory devices Die_11 and Die_21. A second way WAY2 may include the memory devices Die_12 and Die_22. A third way WAY3 may include the memory devices Die_13 and Die_23. A fourth way WAY4 may include the memory devices Die_14 and Die_24.

Each of the channels CH1 and CH2 may be a bus of signals shared and used by memory devices connected to the corresponding channel.

Although the data interleaving in the two channel/four way structure is described with reference to FIG. 4, efficiency of interleaving may be more efficient as the number of channels increases and the number of ways increases.

Figure 5:
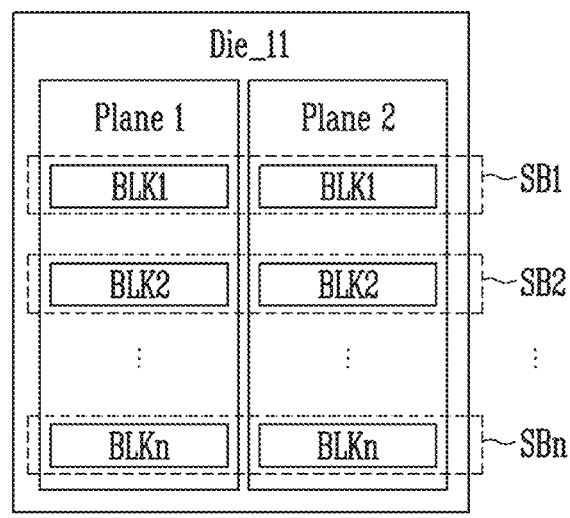
FIG. 5 is a diagram illustrating a super block according to an embodiment of the present disclosure.

FIG. 5 is a diagram illustrating a super block according to an embodiment of the present disclosure.

Referring to FIG. 5, the memory device Die_11 may include a plurality of planes Plane 1 and Plane 2. The number of planes included in one memory device is not limited by the present embodiment. One plane may include a plurality of memory blocks BLK1 to BLKn.

The plane may be a unit independently performing a program operation, a read operation, or an erase operation. Therefore, the memory device may include the address decoder 121 and the read and write circuit 123 described with reference to FIG. 2 for each plane.

The super block may include at least two or more memory blocks included in different planes among memory blocks included in each of the plurality of planes. A definition of the super block is not limited to the present embodiment.

A first super block SB1 may include a first memory block BLK1 included in each of the plurality of planes Plane 1 and Plane 2. A second super block SB2 may include a second memory block BLK2 included in each of the plurality of planes Plane 1 and Plane 2. Similarly, an n-th super block SBn may include an n-th memory block BLKn included in each of the plurality of planes Plane 1 and Plane 2.

Each super block may include a plurality of stripes (or super pages). In storing data in the plurality of planes Plane 1 and Plane 2 or reading stored data from the plurality of planes Plane 1 and Plane 2, the memory controller may store or read data in a stripe unit or a super page unit. That is, the memory device may perform an operation on the plurality of planes Plane 1 and Plane 2 in parallel, and this may be a multi-plane operation.

Figure 6:
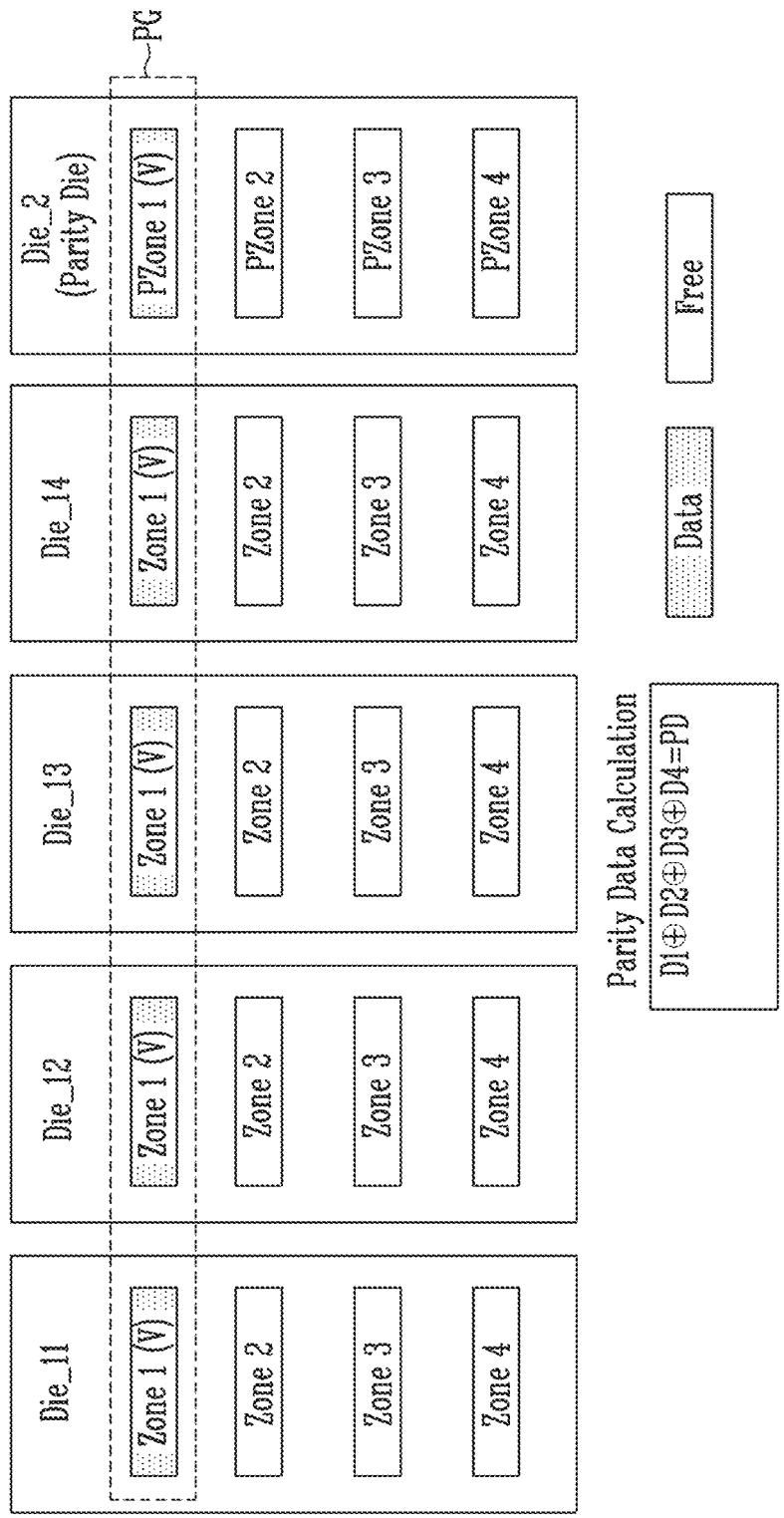
FIG. 6 is a diagram illustrating a parity group including zones in which sequential writing is performed according to an embodiment of the present disclosure.

FIG. 6 is a diagram illustrating a parity group including zones in which sequential writing is performed according to an embodiment of the present disclosure.

Referring to FIG. 6, the storage device may include a plurality of first memory devices Die_11 to Die_14 and a second memory device Parity Die. A memory die may be referred to as a memory device.

Each of the plurality of first memory devices Die_11 to Die_14 may include first to fourth zones Zone 1 to Zone 4. The second memory device Die_2 may include first to fourth parity zones PZone 1 to PZone 4. The second memory device Die_2 may be a memory device that stores parity data. Each zone may be a storage area in which sequential writing is performed, and data corresponding to consecutive logical addresses may be stored in each zone. The number of zones included in each memory device is not limited to the present embodiment.

The first zone 1 of each of the plurality of first memory devices Die_11 to Die_14 and the first parity zone PZone 1 of the second memory device Die_2 may be allocated to one parity group PG. At this time, parity data PD of data stored in the first zone 1 of each of the plurality of first memory devices Die_11 to Die_14 may be stored in the first parity zone PZone 1 of the second memory device Die_2.

For example, the first zone 1 of the first memory device Die_11 may store data D1. The first zone 1 of the first memory device Die_12 may store data D2. The first zone 1 of the first memory device Die_13 may store data D3. The first zone 1 of the first memory device Die_14 may store data D4. The first parity zone PZone 1 of the second memory device Die_2 may store the parity data PD. The parity data PD may be data generated by performing an exclusive OR operation on the data D1 to D4. In FIG. 6, the data D1 to D4 and the parity data PD may be valid.

Figure 7:
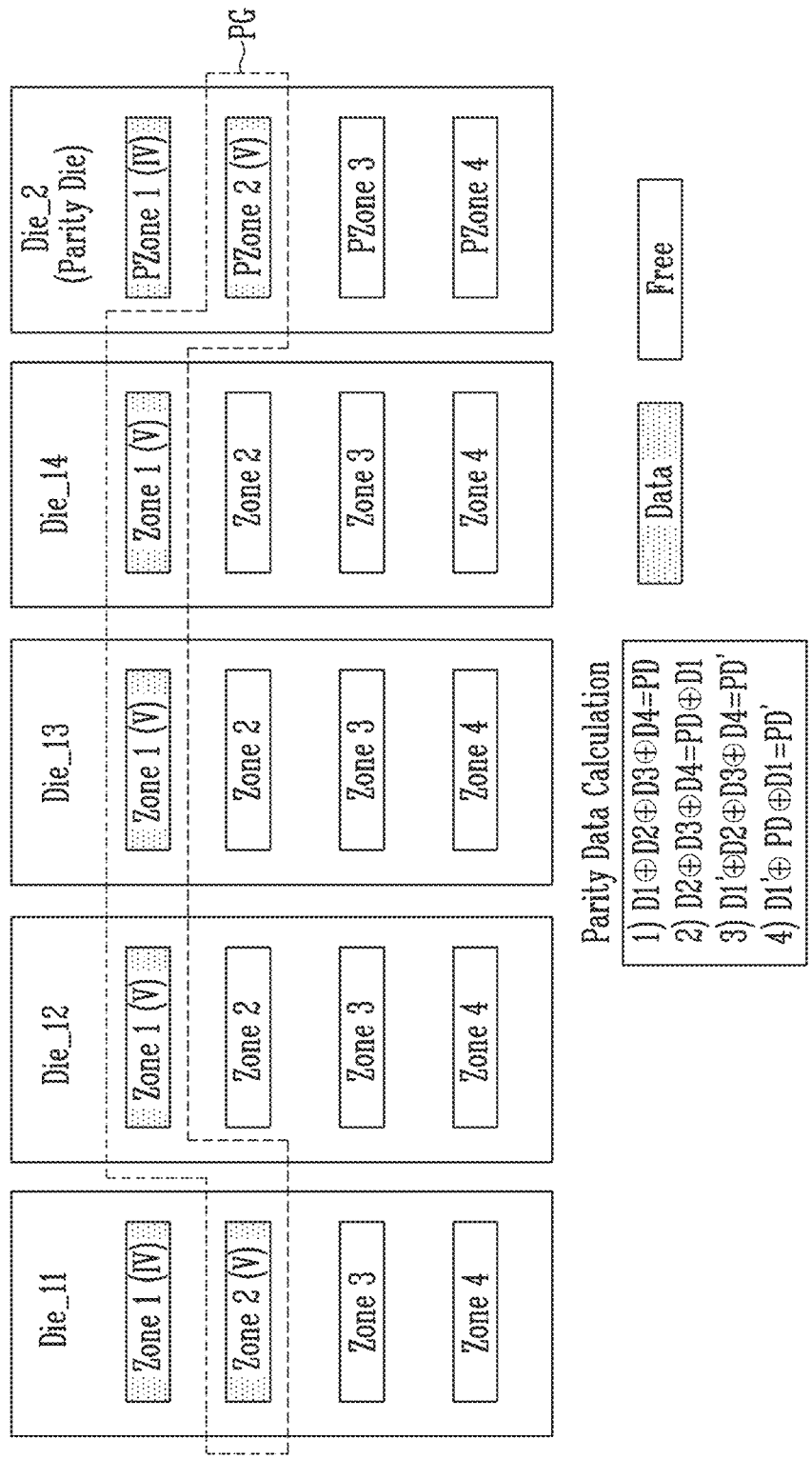
FIG. 7 is a diagram illustrating a parity group including zones in which sequential writing is performed according to an embodiment of the present disclosure.

FIG. 7 is a diagram illustrating a parity group including zones in which sequential writing is performed according to an embodiment of the present disclosure.

Referring to FIG. 7, compared to FIG. 6, new data D1' may be stored in the second zone 2 of the first memory device Die_11. The new data D1' may be data corresponding to the same logical addresses as the data D1 stored in the first zone 1 of the first memory device Die_11. The first zone 1 of the first memory device Die_11 may be invalidated by writing the new data D1' and may be set as an invalid zone. The new data D1' may be valid, and the data D1 may be invalid.

In FIG. 7, the invalidated first zone may be released (or excluded) from the parity group PG. The second zone 2 of the first memory device Die_11 in which the valid new data D1' is stored may be allocated (or included) to the parity group PG as the target zone.

As the data D1 is invalidated, the existing parity data PD may also be invalidated. Therefore, the first parity zone PZone 1 of the second memory device Die_2 storing the parity data PD may also be invalidated. New parity data PD' may be generated by performing an exclusive OR operation on the invalidated data D1, the existing parity data PD, and the new data D1'. The new parity data PD' may be stored in the second parity zone PZone 2 of the second memory device Die_2. The second parity zone PZone 2 of the second memory device Die_2 storing the new parity data PD' may be allocated (or included) to the parity group PG.

According to an embodiment of the present disclosure, when any first zone included in the parity group PG is invalidated by writing of host data into a target zone other than the invalidated first zone, the target zone may be selected in the same memory device including the invalidated first zone. By writing the host data to the selected zone and changing zones belonging to the parity group PG, a chip kill operation may be smoothly performed at a memory device level.

The chip kill operation may be an operation of recovering error data using data stored in other memory devices and the parity data stored in the parity memory device.

Figure 8:
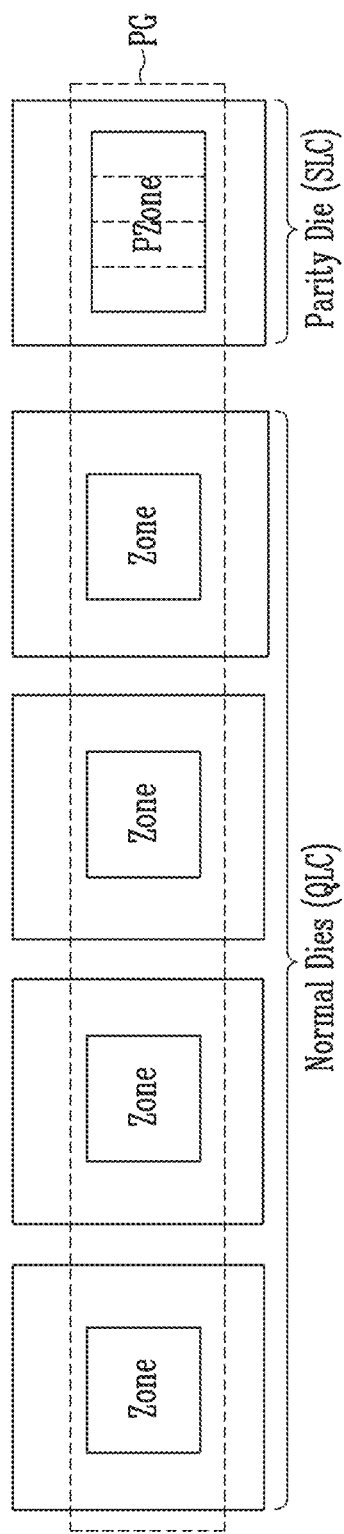
FIG. 8 is a diagram illustrating a relationship between a plurality of memory devices and a parity memory device according to an embodiment of the present disclosure.

FIG. 8 is a diagram illustrating a relationship between a plurality of memory devices and a parity memory device according to an embodiment of the present disclosure.

Referring to FIG. 8, the storage device may include a plurality of memory devices Normal Dies and a parity memory device Parity Die. When data stored in any of the plurality of memory devices Normal Dies is updated, the parity data is also required to be newly written in the parity memory device Parity Die. Therefore, as the number of the plurality of the memory devices Normal Dies included in the parity group PG increases, the number of times the parity data is written to the parity memory device Parity Die also increases.

For example, when one data write operation is performed on each of the plurality of memory devices Normal Dies, four parity data write operations are performed on the parity memory device Parity Die. Therefore, an erase and write count of the parity memory device Parity Die increases in proportion to the number of the plurality of memory devices Normal Dies, the parity memory device Parity Die may be deteriorated and damaged faster than the plurality of memory devices Normal Dies.

Therefore, for reliability and lifespan of the parity memory device Parity Die, the parity memory device Parity Die may include memory cells storing less bits than the plurality of memory devices Normal Dies. This is because as the number of data bits stored in the memory cell decreases, deterioration due to an increase of the erase and write count decreases and lifespan increases. In an embodiment, the parity memory device Parity Die may include memory cells each configured to store n bits, and the plurality of memory devices Normal Dies may include memory cells each configured to store m bits greater than the n bits.

For example, the parity memory device Parity Die may include an SLC storing 1 bit. The plurality of memory devices Normal Dies may include a QLC storing 4 bits. However, the number of data bits stored by the memory cells included in each memory device is not limited to the present embodiment.

Figure 9:
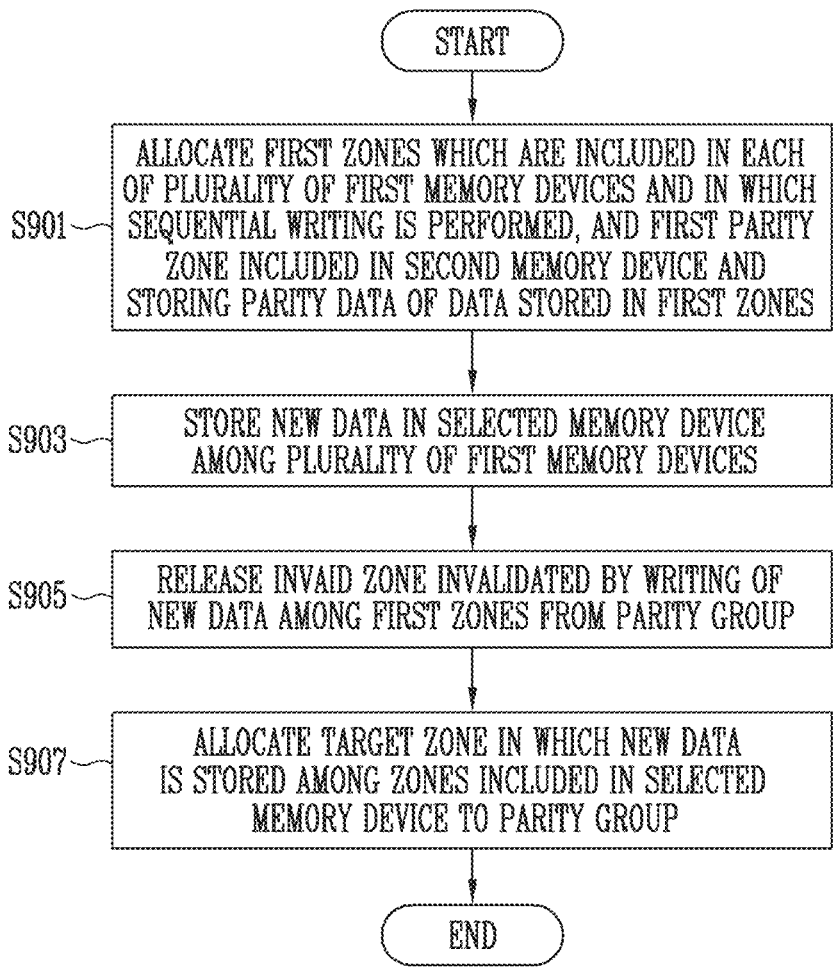
FIG. 9 is a flowchart illustrating a method of operating a storage device according to an embodiment of the present disclosure.

FIG. 9 is a flowchart illustrating a method of operating a storage device according to an embodiment of the present disclosure.

Referring to FIG. 9, in operation S901, the storage device may allocate to the parity group, the first zones which are included in the respective first memory devices and in which the sequential writing is performed, and the first parity zone included in the second memory device and storing the parity data of the data stored in the first zones.

In operation S903, the storage device may store the new data in the memory device selected from among the plurality of first memory devices.

In operation S905, the storage device may release, from the parity group, the first zone invalidated among the first zones by writing of the new data into a target zone among zones included in the selected first memory device including the invalidated first zone.

In operation S907, the storage device may allocate the target zone to the parity group.

Figure 10:
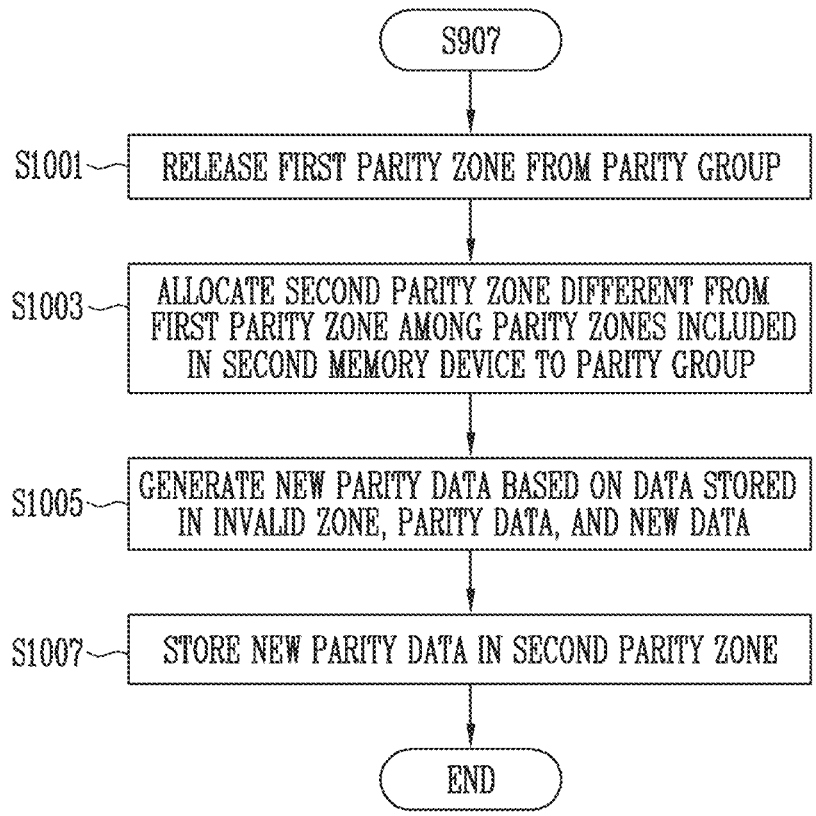
FIG. 10 is a flowchart illustrating a method of operating a storage device according to an embodiment of the present disclosure.

FIG. 10 is a flowchart illustrating a method of operating a storage device according to an embodiment of the present disclosure. Operations in FIG. 10 corresponds to the operation S907 shown in FIG. 9.

Referring to FIG. 10, in operation S1001, the storage device may release the first parity zone from the parity group.

In operation S1003, the storage device may allocate, to the parity group, the second parity zone different from the first parity zone among the parity zones included in the second memory device.

In operation S1005, the storage device may generate the new parity data based on the data stored in the invalidated first zone, the parity data, and the new data.

In operation S1007, the storage device may store the new parity data in the second parity zone.

Figure 11:
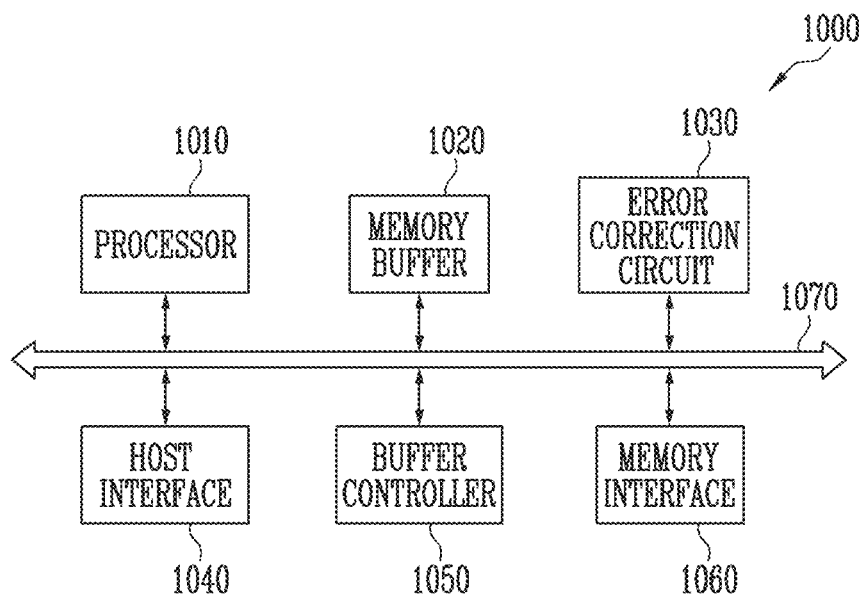
FIG. 11 is a diagram illustrating a memory controller according to another embodiment of the present disclosure.

FIG. 11 is a diagram illustrating a memory controller 1000 according to another embodiment of the present disclosure.

Referring to FIG. 11, the memory controller 1000 is connected to the host and the memory device. The memory controller 1000 may access the memory device in response to the request from the host. For example, the memory controller 1000 may control the write, read, erase, and background operations of the memory device. The memory controller 1000 may provide an interface between the memory device and the host. The memory controller 1000 may drive firmware for controlling the memory device.

The memory controller 1000 may include a processor 1010, a memory buffer 1020, an error correction circuit (ECC) 1030, a host interface 1040, a buffer controller 1050, a memory interface 1060, and a bus 1070.

The bus 1070 may provide a channel between components of the memory controller 1000.

The processor 1010 may control an overall operation of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of an FTL. The processor 1010 may convert an LBA provided by the host into a PBA through the FTL. The FTL may receive the LBA using a mapping table and convert the LBA into the PBA. An address mapping method of the flash translation layer may include various methods according to a mapping unit. A representative address mapping method includes a page mapping method, a block mapping method, and a hybrid mapping method.

The processor 1010 may randomize data received from the host. For example, the processor 1010 may randomize the data received from the host using a randomizing seed. The randomized data is provided to the memory device as data to be stored and is programmed to the memory cell array.

The processor 1010 may de-randomize data received from the memory device during the read operation. For example, the processor 1010 may de-randomize the data received from the memory device using a de-randomizing seed. The de-randomized data may be output to the host.

In an embodiment, the processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The ECC 1030 may perform error correction. The ECC 1030 may perform error correction encoding (ECC encoding) based on data to be written to the memory device through memory interface 1060. The error correction encoded data may be transferred to the memory device through the memory interface 1060. The ECC 1030 may perform error correction decoding (ECC decoding) on the data received from the memory device through the memory interface 1060. For example, the ECC 1030 may be included in the memory interface 1060 as a component of the memory interface 1060.

The host interface 1040 may communicate with an external host under control of the processor 1010. The host interface 1040 may perform communication using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI express), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 1050 may control the memory buffer 1020 under the control of the processor 1010.

The memory interface 1060 may communicate with the memory device under the control of the processor 1010. The memory interface 1060 may communicate a command, an address, and data with the memory device through a channel.

For example, the memory controller 1000 may not include the memory buffer 1020 and the buffer controller 1050.

For example, the processor 1010 may control the operation of the memory controller 1000 using codes. The processor 1010 may load the codes from a nonvolatile memory device (for example, a read only memory) provided inside the memory controller 1000. As another example, the processor 1010 may load the codes from the memory device through the memory interface 1060.

For example, the bus 1070 of the memory controller 1000 may be divided into a control bus and a data bus. The data bus may transmit data within the memory controller 1000 and the control bus may be transmit control information such as a command and an address within the memory controller 1000. The data bus and the control bus may be separated from each other and may not interfere with each other or affect each other. The data bus may be connected to the host interface 1040, the buffer controller 1050, the ECC 1030, and the memory interface 1060. The control bus may be connected to the host interface 1040, the processor 1010, the buffer controller 1050, the memory buffer 1202, and the memory interface 1060.

Figure 12:
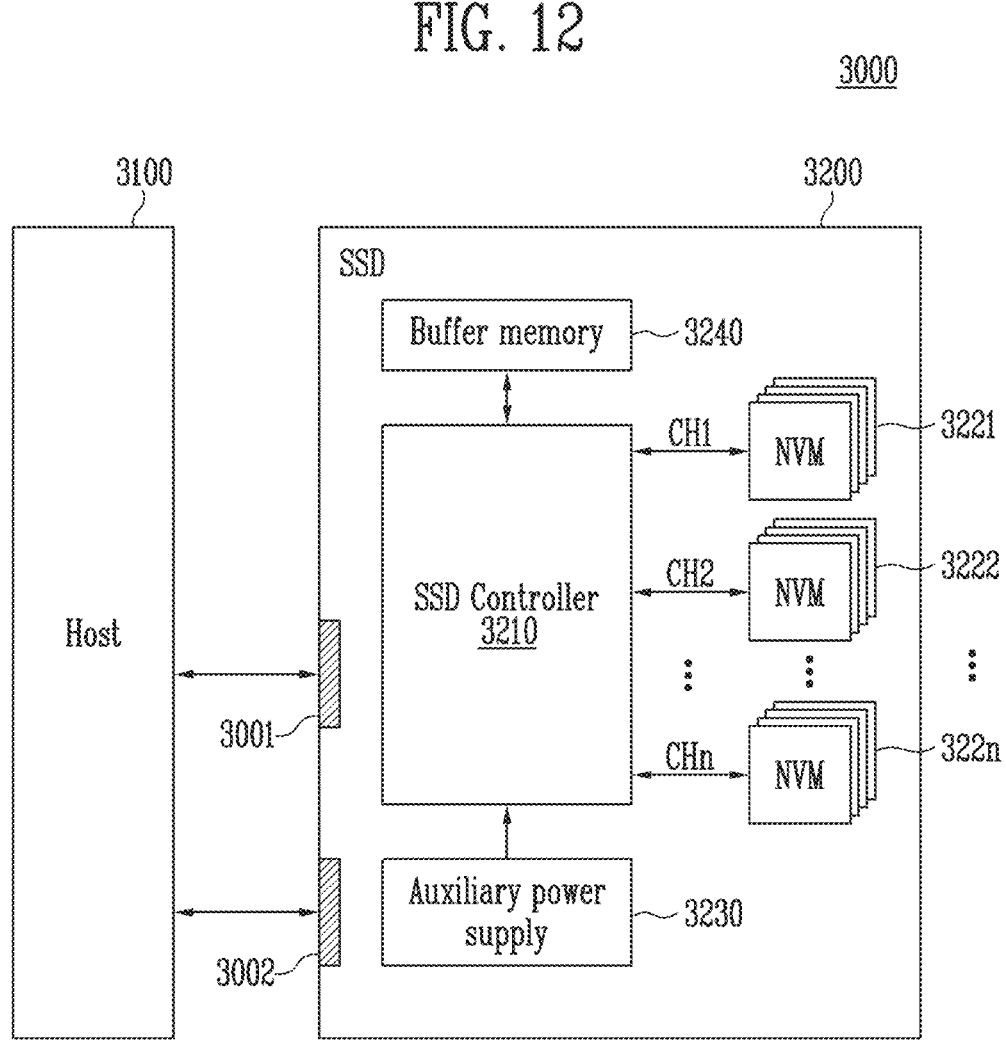
FIG. 12 is a block diagram illustrating a solid state drive (SSD) system to which a storage device according to an embodiment of the present disclosure is applied.

FIG. 12 is a block diagram illustrating a solid state drive (SSD) system to which a storage device according to an embodiment of the present disclosure is applied.

Referring to FIG. 12, the SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of flash memories 3221 to 322n, an auxiliary power device 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal received from the host 3100. For example, the signal may be signals based on an interface between the host 3100 and the SSD 3200. For example, the signal may be a signal defined by at least one of communication standards or interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3230 is connected to the host 3100 through the power connector 3002. The auxiliary power device 3230 may receive the power from the host 3100 and may charge the power. The auxiliary power device 3230 may provide power to the SSD 3200 when power supply from the host 3100 is not smooth. For example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store meta data (for example, a mapping table) of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM. Various embodiments of the present invention have been illustrated and described. Although specific terminologies are used herein, they are used only in the descriptive sense. The present invention is not limited to or by any such term nor any of the above-described embodiments, as many variations are possible within the spirit and scope of the present invention. The present invention encompasses all such variations to the extent that they fall within the scope of the following claims. Furthermore, the embodiments may be combined to form additional embodiments.

What is claimed is:

1. A storage device comprising:
a plurality of first memory devices each including a plurality of blocks;
a second memory device including a plurality of parity blocks for storing parity data; and
a controller configured to:
allocate to a parity group, first blocks included in the first memory devices and a first parity block storing the parity data for data stored in the first blocks, the first parity block being one of the plurality of parity blocks in the second memory device,
release from the parity group, a first block invalidated among the first blocks included in the first memory devices by writing new data into a target block different from the invalidated first block, and
allocate the target block to the parity group.

2. The storage device of claim 1, wherein the controller is further configured to control a first memory device to store the new data in the target block.

3. The storage device of claim 1, wherein the controller is further configured to:
release the first parity block from the parity group; and
allocate to the parity group, a second parity block different from the first parity block among the plurality of parity blocks in the second memory device.

4. The storage device of claim 3, wherein the controller is further configured to generate new parity data by performing an exclusive OR operation on data stored in the invalidated first block, the parity data, and the new data.

5. The storage device of claim 4, wherein the controller is further configured to control the second memory device to store the new parity data in the second parity block.

6. The storage device of claim 1,
wherein the plurality of parity block of the second memory device includes memory cells each configured to store n bits, and
wherein the plurality of blocks of the plurality of first memory devices include memory cells each configured to store m bits greater than the n bits.

7. The storage device of claim 1, wherein data stored in the plurality of blocks corresponds to consecutive logical addresses.

8. A controller comprising:
a storage area manager configured to allocate to a parity group, first blocks included in first memory devices and a first parity block included in a second memory device, the first parity block storing parity data for data stored in the first blocks; and
a write controller configured to write new data in a selected first memory device of the first memory devices,
wherein the storage area manager is further configured to:
release from the parity group, a first block invalidated among the first blocks included in the first memory devices by writing the new data into a target block different from the invalidated first block; and
allocate the target block to the parity group.

9. The controller of claim 8, wherein the write controller is configured to write the new data in the selected first memory device by controlling the selected memory device to store the new data in the target block.

10. The controller of claim 8, wherein the storage area manager is further configured to:
release the first parity block from the parity group; and
allocate to the parity group, a second parity block included in the second memory device and different from the first parity block.

11. The controller of claim 10, further comprising a parity generator configured to generate new parity data by performing an exclusive OR operation on data stored in the invalidated first block, the parity data, and the new data.

12. The controller of claim 11, wherein the write controller is further configured to control the second memory device to store the new parity data in the second parity block.

13. The controller of claim 12,
wherein the second memory device includes memory cells each configured to store n bits, and wherein the first memory devices include memory cells each configured to store m bits greater than the n bits.

14. The controller of claim 8, wherein data stored in the first blocks corresponds to consecutive logical addresses.

15. A memory system comprising:
- at least first and second dies including original data blocks storing original first and second data, respectively;
- a parity die including an original parity block storing an original parity data for the original first and second data; and
- a controller configured to:
- control the first die to store updated first data in a target data block,
- generate an updated parity data based on the original parity data, the original first data and the updated first data, and
- control the parity die to store the updated parity data in a target parity block of the parity die.

16. The memory system of claim 15, wherein the controller is further configured to:
invalidate the original first data.

17. The memory system of claim 16, wherein the controller is further configured to:
- release the original parity block; and
- allocate a parity block different from the original parity block as the target parity block in the parity die.

18. The memory system of claim 15, wherein the controller generates the updated parity data by performing an exclusive OR operation on the original first data, the original parity data, and the updated first data.

19. The memory system of claim 15,
- wherein the parity die includes memory cells each configured to store n bits, and
- wherein the at least first and second dies include memory cells each configured to store m bits greater than the n bits.

20. The memory system of claim 15, wherein the original first and second data stored in the original data blocks corresponds to consecutive logical addresses.

* * * * *